US008089469B2

(12) United States Patent
Iorfida et al.

(10) Patent No.: US 8,089,469 B2
(45) Date of Patent: *Jan. 3, 2012

(54) ELECTRONIC DEVICE WITH INTELLIGENT KEYBOARD ILLUMINATION

(75) Inventors: Dario Iorfida, Fiumicino (IT); Sandro Piccinini, Rome (IT)

(73) Assignee: International Business Machines Corporation, Armonk, NY (US)

(*) Notice: Subject to any disclaimer, the term of this patent is extended or adjusted under 35 U.S.C. 154(b) by 537 days.

This patent is subject to a terminal disclaimer.

(21) Appl. No.: 12/268,639

(22) Filed: Nov. 11, 2008

(65) Prior Publication Data

US 2009/0243898 A1    Oct. 1, 2009

Related U.S. Application Data

(63) Continuation of application No. 12/060,253, filed on Mar. 31, 2008, now Pat. No. 7,453,441.

(51) Int. Cl.
*G09G 5/00* (2006.01)
(52) U.S. Cl. .................. 345/170; 345/168; 341/22
(58) Field of Classification Search .......... 345/168–170
See application file for complete search history.

(56) References Cited

U.S. PATENT DOCUMENTS

| | | | |
|---|---|---|---|
| 5,736,976 A | 4/1998 | Cheung | |
| 5,852,414 A | 12/1998 | Yu et al. | |
| 5,953,541 A * | 9/1999 | King et al. | 710/67 |
| 5,963,671 A | 10/1999 | Comeford et al. | |
| 6,621,424 B1 | 9/2003 | Brad | |
| 6,646,572 B1 | 11/2003 | Brad | |
| 7,205,959 B2 * | 4/2007 | Henriksson | 345/4 |
| 7,283,066 B2 | 10/2007 | Shipman | |
| 7,663,603 B2 * | 2/2010 | Hatch | 345/169 |
| 2005/0073446 A1 | 4/2005 | Lazaridis et al. | |
| 2005/0231933 A1 | 10/2005 | Chuang | |
| 2005/0250547 A1 | 11/2005 | Salman et al. | |
| 2006/0011461 A1 | 1/2006 | Chen et al. | |
| 2006/0022951 A1 | 2/2006 | Hull | |
| 2006/0158353 A1 | 7/2006 | Tseng | |
| 2006/0283698 A1 | 12/2006 | Huang et al. | |
| 2007/0046641 A1 | 3/2007 | Lim | |
| 2007/0132735 A1 | 6/2007 | Gil-Gomez | |
| 2008/0158020 A1 * | 7/2008 | Griffin | 341/22 |

OTHER PUBLICATIONS

Fox, Scanned optical keyboard, IBM Technical Disclosure Bulletin, Feb. 1978, vol. 20, No.

* cited by examiner

*Primary Examiner* — Duc Dinh
(74) *Attorney, Agent, or Firm* — Jeffrey S. LaBaw

(57) ABSTRACT

An electronic device includes a computer keyboard having keys that are each capable of individual illumination. An electronic dictionary is provided for determining a set of most likely keys to be needed for an application, wherein the electronic dictionary is updated to include new words typed on the keyboard. The keyboard is operated with a user enabled/disabled function of selective illumination of respective keyboard keys so that a set of most likely alphabet keys according to the electronic dictionary along with an enter key and space bar are illuminated if a word processor application is running. Numeric keys are illuminated if a calculator application is running. The selective illumination is automatically disabled if user identification and password fields are being filled. All of the keys are automatically illuminated after a configured timeframe in which none of the suggested keys have been pressed. All of the keys are unlit after an additional configured timeframe in which none of the keys have been pressed.

1 Claim, 1 Drawing Sheet

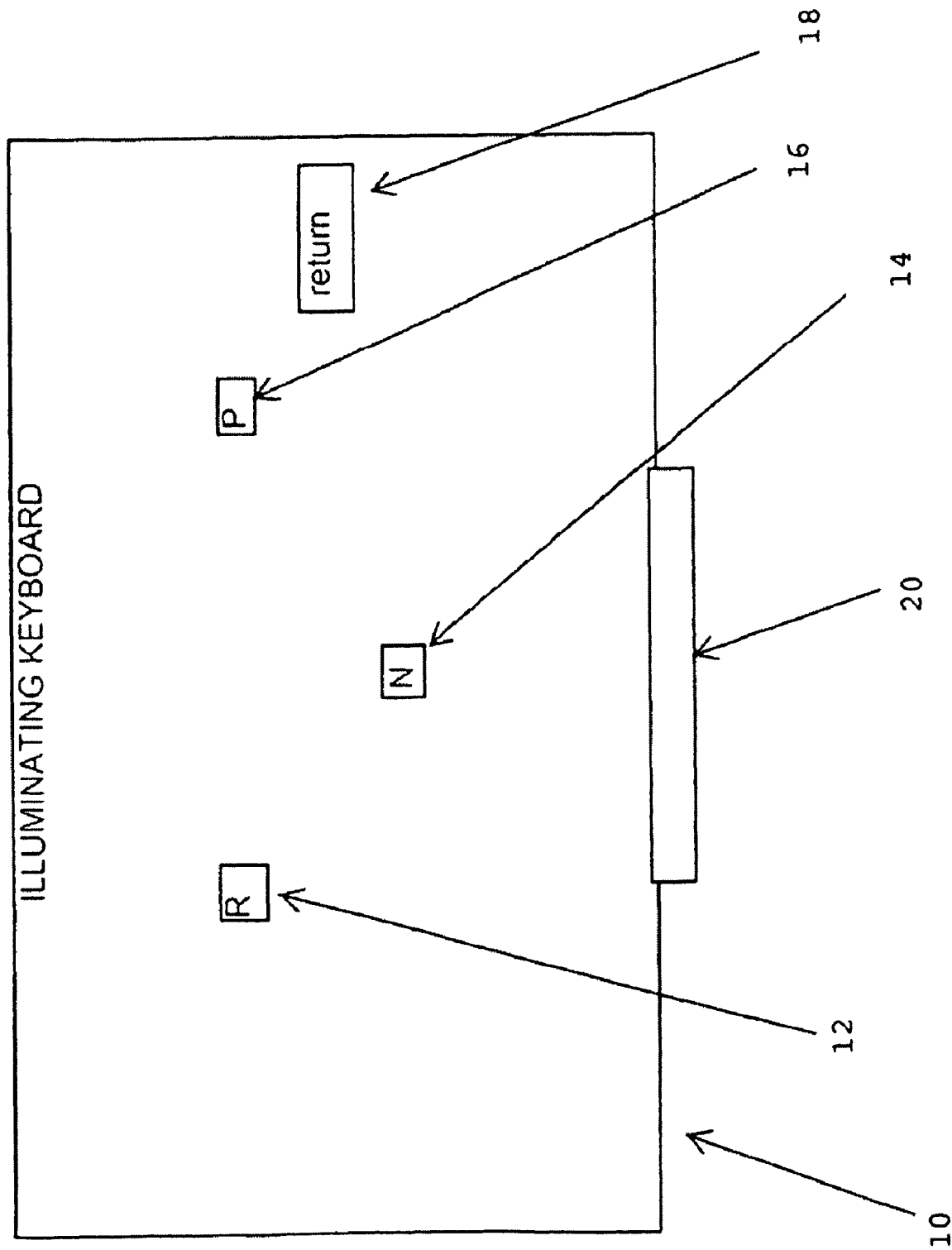

ELECTRONIC DEVICE WITH INTELLIGENT KEYBOARD ILLUMINATION

CROSS-REFERENCE TO RELATED APPLICATIONS (Not Applicable)

STATEMENT REGARDING FEDERALLY SPONSORED RESEARCH OR DEVELOPMENT (Not Applicable)

THE NAMES OF THE PARTY TO A JOINT RESEARCH AGREEMENT (Not Applicable)

INCORPORATION-BY-REFERENCE OF MATERIAL SUBMITTED ON A COMPACT DISC (Not Applicable)

This application is a continuation of application Ser. No. 12/060,253 filed Mar. 31, 2008, now U.S. Pat. No. 7,453,441 status allowed.

BACKGROUND OF THE INVENTION (1) Field of the Invention

This disclosure is directed to a method and system for intelligent computer keyboard illumination.

(2) Description of Related Art Including Information Submitted Under 37 CFR 1.97 and 1.98

Illuminated keyboards are known. For example, Gil-Gomez (U.S. Published Patent Application No. 20070132735) discloses selectively illuminated keyboard systems and methods.

BRIEF SUMMARY OF THE INVENTION

The present invention provides an electronic device having a computer keyboard having keys that area each capable of individual illumination. An electronic dictionary is provided for determining a set of most likely keys to be needed for an application, wherein the electronic dictionary is updated to include new words typed on the keyboard. The keyboard is operated with a user enabled/disabled function of selective illumination of respective keyboard keys so that a set of most likely alphabet keys according to the electronic dictionary along with an enter key and space bar are illuminated if a word processor application is running. Numeric keys are illuminated if a calculator application is running. The selective illumination is automatically disabled if user identification and password fields are being filled. All of the keys are automatically illuminated after a configured timeframe in which none of the suggested keys have been pressed. All of the keys are unlit after an additional configured timeframe in which none of the keys have been pressed.

BRIEF DESCRIPTION OF THE SEVERAL VIEWS OF THE DRAWING(S)

This disclosure is further described in the detailed description that follows, with reference to the drawings, in which the FIGURE illustrates a representation of a selectively illuminated computer keyboard.

DETAILED DESCRIPTION OF THE INVENTION

Exemplary embodiments of this disclosure are described herein by way of example.

In particular, this disclosure is directed to a computer keyboard such as keyboard 10 in the FIGURE, having selectively illuminated keys (the "R" key 12, the "W" key 14, and the "P" key 16, along with the return key 18 and the space bar key 20 are shown illuminated in the FIGURE) and related methods and systems utilizing the keyboard. Users can utilize notebook or laptop computers and other electronic medium in a large variety of places where often illumination may not be suitable enough for the users to clearly identify keys on electronic keyboards.

A solution can be based on the continuous illumination of the keys similar to the way commercial mobile telephones are illuminated. Another solution is to provide a small light such as those utilized on the top of laptop screens.

However, a disadvantage of such solutions is the fact that the illumination itself is power consuming so that the use of the light can have a large impact on battery consumption and, therefore, a large impact on the capability of the user using the device for a long period of time without a power connection.

Moreover, some individuals that use keyboards may not be accomplished in typing on the keyboard, and they may search often for the next character to type. A method, apparatus, and system that can help them reduce the time in writing a document can be very beneficial.

At least one aspect of this disclosure is directed to a method, apparatus, and system to address the above-discussed issues by the utilization of an intelligent system for keyboard illumination.

The method, apparatus, and system take advantage of the fact that a user generally does not need the entire set of keys, such that the system can save power simply lighting the keys that are going to be probabilistically utilized.

Thus, with this method, apparatus, and system, the keys that are most likely to be utilized are illuminated rather than illumination of the entire keyboard.

In order to forecast the next keys the user needs, the method, apparatus, and system utilize a dictionary to determine the most likely keys to be needed and provide the illumination of the keys that are suggested by the dictionary. For example, logic can be utilized that is the same as or similar to the logic utilized by a T9 dictionary based system.

Moreover the dictionary can be:

continuously updated by any new used words typed on the keyboard;

based on the specific application that is running on the system (for example Microsoft Word or the Calculator); and/or disabled in case of user/password fields filling (e.g., unlocking the system).

The specific power profile of the user can be configured so that the user can enable or disable the profile based on their preferences.

Additionally, the system can be configured to recognize that, after a configured timeframe during which none of the suggested keys have been pressed, the system can automatically highlight all of the keys and/or after a new configured timeframe, hide (not illuminate) all of the keys (for example the user may be thinking or performing another operation and not typing for an extended period of time) in a screensaver-like mode. Additionally, in at least some embodiments, the keys can all be hidden (not illuminated) if the screensaver starts or if the user locks the system.

With at least some embodiments, the above techniques can be utilized to help a user practice typing to become more accomplished at typing.

The foregoing exemplary embodiments have been provided for the purpose of explanation and are in no way to be construed as limiting this disclosure. This disclosure is not limited to the particulars disclosed herein, but extends to all embodiments within the scope of the appended claims, and any equivalents thereof.

The invention claimed is:

1. An electronic device, comprising:
 a computer keyboard having keys that are each capable of individual illumination;
 an electronic dictionary for determining a set of most likely keys to be needed for an application, wherein the electronic dictionary is updated to include new words typed on the keyboard;
 wherein the keyboard is operated with a user enabled/disabled function of selective illumination of respective keyboard keys so a set of most likely alphabet keys determined by the electronic dictionary along with an enter key and space bar are illuminated if a word processor application is running, numeric keys are illuminated if a calculator application is running, the selective illumination is automatically disabled if user identification and password fields are being filled, all of the keys are automatically illuminated after a configured timeframe in which none of the suggested keys have been pressed, and all of the keys are unlit after an additional configured timeframe in which none of the keys have been pressed.

* * * * *